(12) United States Patent
Kulkarni et al.

(10) Patent No.: US 8,902,471 B2
(45) Date of Patent: Dec. 2, 2014

(54) SYSTEM AND METHOD FOR CONVERTING OVER-RANGE COLORS

(75) Inventors: Manish S. Kulkarni, Saratoga, CA (US); Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/484,813

(22) Filed: May 31, 2012

(65) Prior Publication Data

US 2012/0237120 A1  Sep. 20, 2012

Related U.S. Application Data

(63) Continuation of application No. 11/770,440, filed on Jun. 28, 2007, now Pat. No. 8,237,990.

(51) Int. Cl.
*H04N 1/40* (2006.01)
*H04N 1/60* (2006.01)

(52) U.S. Cl.
CPC ............ *H04N 1/603* (2013.01); *H04N 1/6061* (2013.01); *H04N 1/6069* (2013.01); *H04N 1/6058* (2013.01); *G09G 2340/06* (2013.01); *G09G 2320/0271* (2013.01)
USPC ........... 358/3.23; 358/1.9; 358/518; 358/521; 358/523; 382/167

(58) Field of Classification Search
USPC ............................. 358/1.9, 518–523; 382/167
See application file for complete search history.

(56) References Cited

U.S. PATENT DOCUMENTS

| | | | |
|---|---|---|---|
| 5,377,025 A | 12/1994 | Spaulding et al. | |
| 5,500,921 A | 3/1996 | Ruetz | |
| 5,699,491 A * | 12/1997 | Barzel | 358/1.9 |
| 5,835,244 A | 11/1998 | Bestmann | |
| 6,124,944 A | 9/2000 | Ohta | |
| 6,178,008 B1 | 1/2001 | Bockman et al. | |
| 6,208,351 B1 | 3/2001 | Borg et al. | |
| 6,229,915 B1 | 5/2001 | Ohkubo | |

(Continued)

FOREIGN PATENT DOCUMENTS

| | | |
|---|---|---|
| EP | 0 706 287 | 4/1996 |
| EP | 0 901 278 A1 | 3/1999 |
| EP | 1 107 090 A1 | 6/2001 |

OTHER PUBLICATIONS

PCT International Search Report, PCT/US2008/068436, Feb. 27, 2009, pp. 1-3.

(Continued)

*Primary Examiner* — Richard Zhu
(74) *Attorney, Agent, or Firm* — Kilpatrick Townsend & Stockton LLP

(57) ABSTRACT

A method includes dividing an input range of color values of a first color space into a plurality of sub-ranges, wherein at least one of the sub-ranges comprises an over-range color value. The method also includes determining for each sub-range a level of accuracy in converting color values within each sub-range. The method further includes determining a processing step to be applied to input color values in each sub-range based on the determined level of accuracy.

19 Claims, 3 Drawing Sheets

(56) References Cited

U.S. PATENT DOCUMENTS

| | | |
|---|---|---|
| 6,466,333 B1 | 10/2002 | Schoolcraft et al. |
| 6,519,361 B1 | 2/2003 | Taillie et al. |
| 6,591,009 B1 * | 7/2003 | Usami et al. ............ 382/165 |
| 6,657,746 B1 | 12/2003 | Fuchigami et al. |
| 6,724,500 B1 | 4/2004 | Hains et al. |
| 6,735,334 B2 * | 5/2004 | Roberts ............ 382/167 |
| 6,781,716 B1 | 8/2004 | Yoda |
| 6,870,636 B2 | 3/2005 | Kulkarni |
| 7,023,585 B1 | 4/2006 | Borg |
| 7,030,888 B1 | 4/2006 | Edge et al. |
| 7,333,237 B2 * | 2/2008 | Ogatsu et al. ............ 358/1.9 |
| 7,595,921 B2 | 9/2009 | Ito et al. |
| 2001/0033286 A1 | 10/2001 | Stokes et al. |
| 2003/0185437 A1 | 10/2003 | Nakami |
| 2006/0250624 A1 | 11/2006 | Spaulding et al. |
| 2007/0091337 A1 * | 4/2007 | Morovic ............ 358/1.9 |

OTHER PUBLICATIONS

PCT Written Opinion of the International Searching Authority, PCT/US2008/068436, Feb. 27, 2009, pp. 1-7.

Florian Kainz, "A Proposal for Open EXR Color Management," Industrial Light & Magic, Revision 5, Aug. 5, 2004, 9 pages.

Johannes Kopf et al., "Capturing and Viewing Gigapixel Images," ACM Transactions on Graphics (Proceedings of SIGGRAPH 2007), vol. 26, No. 3, 10 pages.

Manish S. Kulkarni, "Methods and Systems for Encoding Over-Range Color Values Using In-Range Values" U.S. Appl. No. 11/777,009, filed Jul. 12, 2007, Office Action mailed Jun. 11, 2010, 13 pages.

Manish S. Kulkarni, "Methods and Systems for Encoding Over-Range Color Values Using In-Range Values" U.S. Appl. No. 11/777,009, filed Jul. 12, 2007, Amendment filed Sep. 13, 2010, 9 pages.

* cited by examiner

SYSTEM AND METHOD FOR CONVERTING OVER-RANGE COLORS

CROSS-REFERENCE TO RELATED APPLICATION

This application is a continuation and claims the benefit under 35 U.S.C. §120 of U.S. patent application Ser. No. 11/770,440, entitled "System and Method for Converting Over-Range Colors," filed Jun. 28, 2007, which is incorporated herein by reference in its entirety.

BACKGROUND

The present disclosure relates to the field of data processing, and more specifically to converting over-range colors.

Digital devices that create (e.g., scanners and digital cameras), display (e.g. CRT and LCD monitors), or print (e.g. ink jet and laser printers) colors typically define color data using color spaces. Generally, a color space is a combination of a color model and a gamut. A color model defines each color within the model using components, such as, in the case of a Red, Green, Blue (RGB) color model, the levels of red, green, and blue light components needed to create each color. Levels of each component in the RGB color model typically range from 0 to 100 percent of full intensity, or which may be represented on a scale of 0 to 1. By varying the levels or intensities of the components, each color in the color model may be created. However, as a practical matter a device is often limited in its ability to create pure red, green, or blue light, which limits its range of colors or color gamut. A gamut is simply the range of colors that may be displayed on or captured by a particular device.

The differences in device gamuts lead to differences in color spaces between two devices. For example, two devices that use RGB may show different colors when each displays its most intense red. The most intense red on a first device may have an intensity of 1 for the R component and 0 for the G and B components. However, the color that looks the same as the most intense red of the first device may have a red intensity of 0.85 on a second device. Moreover, the G and B component intensities may even be 0.05 on the second device. In other words, the same perceived "red" color has different RGB component values depending on the device, on the first device it may be (1, 0, 0) and on the second device that same "red" may be (0.85, 0.05, 0.05). This means that an image file containing only RGB values, if displayed directly by both devices, would appear differently on the two devices.

To solve this problem of the same component values appearing differently on different devices, color spaces are defined in relation to device-independent color spaces, which define colors in more absolute terms. Some examples of device-independent color spaces include the CIE XYZ and CIE L*a*b* color spaces. Many systems and applications use the sRGB color space, whose relation to the device-independent color spaces is well-known in the art. The relationship of a device's native color space with a device-independent color space typically is described by some combination of formulas, transfer functions, matrices, and look up tables. This relationship may be stored in an International Color Consortium (ICC) profile for the device. The device-independent color space may be used as an intermediate when converting from one device-dependent color space to another.

The conversion from one color space to another may be done through a series of processing steps. Some processing steps may be more computationally intensive than others. Some processing steps may require interpolation. Generally, there is a tradeoff between the number of steps, the complexity of each step, speed, and accuracy. In some applications, speed is of the essence and accuracy is sacrificed by reducing the number of steps and/or the complexity of the individual steps. Other applications may require exacting conversion, in which case conversion speed may decrease. Often to increase speed, a three-dimensional look up table (3D LUT) is used either alone or with another simple processing step. A 3D LUT maps points in one color space to corresponding points in another color space. For example, a color in a first RGB color space may have the color component values of (0, 0.4572, 0.82) which, when converted to a second RGB color space, the color may have the color component values (0.001, 0.5013, 0.764). A 3D LUT may be constructed by transforming a regularly spaced grid of colors in a first color space to a second color space using the most accurate processing steps. Each grid point and its corresponding transform point in the second color space may be stored in the 3D LUT. Converting colors that do not correspond to the grid points would involve interpolation, therefore, the more grid points the more accurate the conversion. However, increasing the number of the grid points complicates the 3D LUT and may result in an increase in processing time.

SUMMARY

This specification describes technologies relating to color conversion of over-range colors.

In general, one aspect of the subject matter described in this specification can be embodied in a method that includes dividing an input range of color component values of a first color space into a plurality of sub-ranges, wherein at least one of the sub-ranges comprises an over-range value. The method also includes determining for each sub-range a level of accuracy for converting color component values within the sub-range. The method further includes receiving an identification of a particular color in the first color space, wherein the identification is within a particular sub-range. The method also includes determining one or more processing steps for converting input color values to a second color space based upon the determined levels of accuracy.

Another aspect of the subject matter described in this specification, in general, can be embodied in a method that includes receiving an input color value of a color in a first color space, wherein the input color value is outside of a range of color values in the first color space, and wherein the input color value is within a particular sub-range of color values in the first color space. The method also includes converting the input color value to a corresponding output color value of a color in a second color space using a pre-determined accuracy level associated with the particular sub-range. Other embodiments of these aspects include corresponding systems, apparatus, and computer program products.

These and other embodiments can optionally include one or more of the following features. The method can include receiving an input color value of a color in the first color space, wherein the input color value is within a particular sub-range; and converting the input color value to a corresponding output color value of a color in a second color space based on the determined processing step applied to a sub-range comprising the input color value. The method can also include clipping the values outside of a certain range. The first color space can be described in an International Color Consortium (ICC) profile. The method can further include creating a one-dimensional look up table (1D LUT) based on the determined accuracy, wherein the LUT comprises points corresponding to the input color range and values correlating with the determined accuracy for each sub-range, such that the slope of the line segments mapping the points to the values increases as accuracy increases. The method can also include creating a three-dimensional look up table (3D LUT) for converting the identification of the particular color to a corresponding color in the second color space, wherein creating a 3D LUT comprises applying the inverse of the 1D LUT to a regularly spaced 3D grid of colors in the first color space, and applying one or more processing steps that convert colors from the first color space to the second color space. The method can also include assigning ranks to each sub-range based on a desired accuracy of color conversion for colors in each sub-range, where the highest rank corresponds to the sub-range having the highest desired accuracy and lower ranks correspond to lower desired accuracy. The particular sub-range can include an over-range color. The conversion can be real-time or substantially real-time.

Particular embodiments of the subject matter described in this specification can be implemented to realize one or more of the following advantages. Over-range color values may be processed accurately without sacrificing processing speed by combining the conversion processing steps into a 1D LUT and a 3D LUT. Flexibility in handling the accuracy of various sub-ranges of over-range colors may be obtained by assigning accuracies to the various ranges. Another advantage may be that the size of a 3D LUT used in the conversion remains relatively manageable.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

As mentioned before, the sRGB color space has been widely adopted and is often considered the standard color space for digital image files. One drawback of sRGB color data is its limited gamut. The range of colors detectable by the human eye far exceeds the range of colors in the sRGB color gamut. With the proliferation of computer-generated imagery (CGI) video and high quality digital photography, digital color data increasingly may contain colors that are brighter or darker than those in the sRGB gamut. In these applications, restricting the color gamut to the sRGB color gamut may be undesirable and even may be unacceptable. Thus, it is sometimes important to keep and process color data that falls outside the sRGB color gamut.

The term "in-range," as used herein, refers to component values falling within the range defined by the minimum and the maximum intensity values for each color component in a color space, such as sRGB. For example, many color spaces based on RGB, YCrCb, and other color models may have in-range values expressed as values between 0 and 1, inclusively. The term "over-range," as used herein, refers to values falling outside the range minimum and maximum intensity values for each color component in a color space. Over-range values are typically expressed as values less than 0 or greater than 1.

Processing over-range color data may complicate the conversion process. A three-dimensional look up table (3D LUT) is often used to speed color space conversions. More grid points in the 3D LUT leads to fewer interpolation errors in the conversion process. However, greatly increasing the number of grid points in the 3D LUT may introduce performance problems.

For example, a 3D LUT having 16 sample points for each color component may be used to accurately convert in-range color values from one color space to another. However, if over-range color values are also processed with the same degree of accuracy used for the in-range color values, the 3D LUT may have to increase to an unmanageable size. Another option is to process the in-range values and disregard or clip the over-range values, which would result in the loss of the over-range color data. A final option is to process the in-range values with a 3D LUT, and then process the over-range values using the formulas and processing steps. This final option may be too slow to be applied in real-time video applications. To address these issues, certain embodiments may allow relatively fast conversion of over-range color values without sacrificing much accuracy.

Figure 1:
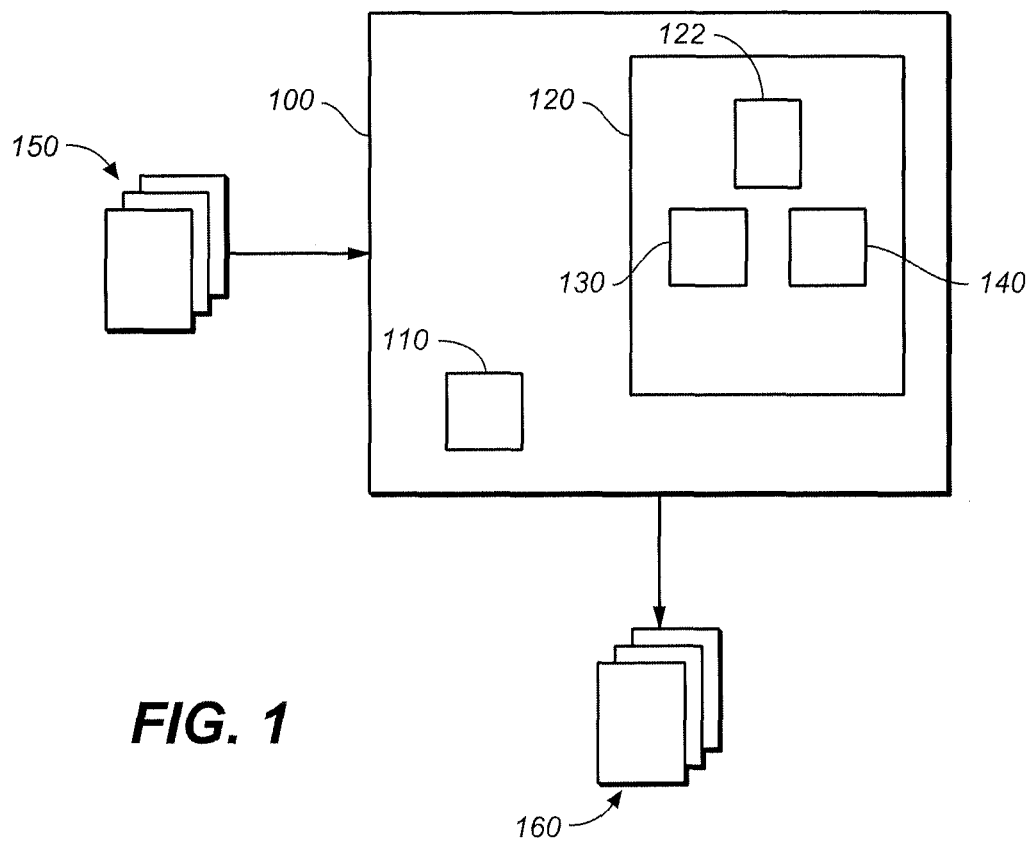
FIG. 1 is a block diagram of a color conversion system.

As shown in FIG. 1, a color conversion system 100 includes a processor 110 and a memory 120 that holds accuracy information 130 and conversion information 140. Generally, the color conversion system 100 may define different accuracy levels for sub-ranges of input color component values for an input color space 150, and may define the processing step to be applied to color component values in each sub-range in order to convert color component values from the input color space 150 to an output color space 160.

A processor 110 may be suitable for the execution of a computer program, and includes, by way of example, both general and special purpose microprocessors, and any one or more processors of any kind of digital computer. Moreover, the processor 110 may be embedded in another device, e.g., a mobile telephone, a personal digital assistant (PDA), a mobile audio player, a Global Positioning System (GPS) receiver, a notebook computer, a desktop computer, or a server, to name just a few possible examples. Generally, a processor will be operatively coupled to receive data and/or instructions from, or transfer data to, a memory 120.

The memory 120 is a computer-readable media suitable for storing computer program instructions and data. The memory 120 may be any form of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may include color conversion software 122, the accuracy information 130, and the conversion information 140. The processor 110 and the memory 120 can be supplemented by, or incorporated in, special purpose logic circuitry.

Generally, the color conversion software 122 may be a computer program that is executed by the processor 110 to facilitate color conversion. A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The accuracy information 130 is data stored in the memory 120 that captures the degrees of accuracy used during color conversions for the various sub-ranges of input color component values. The accuracy information 130 may be described in a table, a matrix, a formula, a flat file, a computer program, or any combination of these. In one example, the accuracy information 130 may be described in a one-dimensional look up table (1D LUT). A 1D LUT is essentially a table that maps discrete inputs to discrete outputs, and can be used to interpolate outputs for input points that fall between the discrete inputs stored in the table.

The conversion information 140 is data stored in the memory 120 that facilitates the transformation of color data from the input color space 150 to the output color space 160. The conversion information 140 may be described in a table, a matrix, a formula, a flat file, a computer program, or any combination of these. The conversion information 140 may describe or embody any type of processing that is usually associated with color conversion. The processing may be a single step or a series of steps that may utilize any combination of formulas, matrices, or look up tables. The conversion information 140 may include processing using a second 1D LUT in addition to the 1D LUT described above. The second 1D LUT may be used, for example, to reduce non-linearities in the input color space.

The conversion information 140 may also be described in a 3D LUT. A 3D LUT is essentially a three-dimensional table that maps discrete input points, as given by their three-dimensional coordinates, to discrete output points. For example, an input point having coordinates or components (5, 5, 10) may be mapped to an output point having coordinates or components (17, 3, 6). A 3D LUT for converting between color spaces may be created using data obtained from experimentation or mathematically using known processing steps. The accuracy information 130 and the conversion information 140 may be logically combined.

In operation, the processor 110 executes the color conversion software 122. In so doing, system 100 may determine the range of interest of input color component values of the input color space 150. Typically, the range of interest may contain at least in-range color component values. The range of interest also may include some over-range color component values. Over-range color component values that exceed the range of interest may be ignored, clipped, or converted using another mechanism. The range of interest may be divided into sub-ranges. Each sub-range may be assigned a level of accuracy to be used when converting color component values within the sub-range. The levels of accuracy may be stored in the accuracy information 130. The accuracy information 130 is then used to determine the conversion information 140. After the accuracy information 130 and the conversion information 140 have been determined, system 100 may receive color data encoded in the input color space 150 and convert the input color data to color data encoded in the output color space 160 using the accuracy information 130 and the conversion information 140.

Figure 2A:
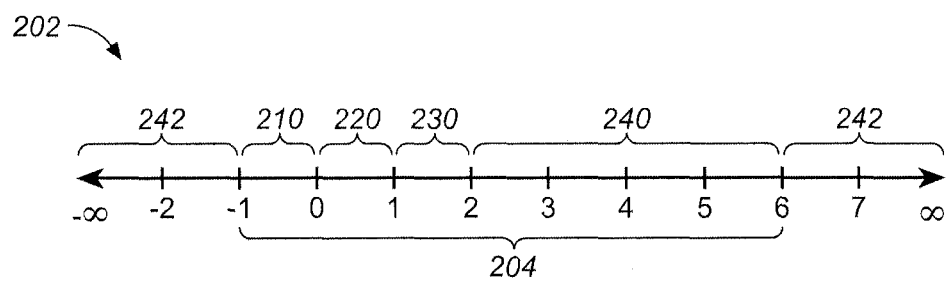
FIG. 2A is a graph illustrating the possible range of input color values.
Figure 2B:
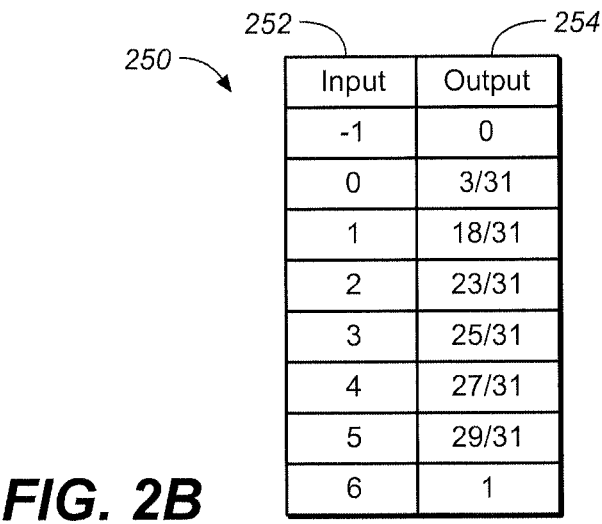
FIG. 2B is a depiction of a one dimensional look up table that captures the accuracy of the input color value sub-ranges.
Figure 2C:
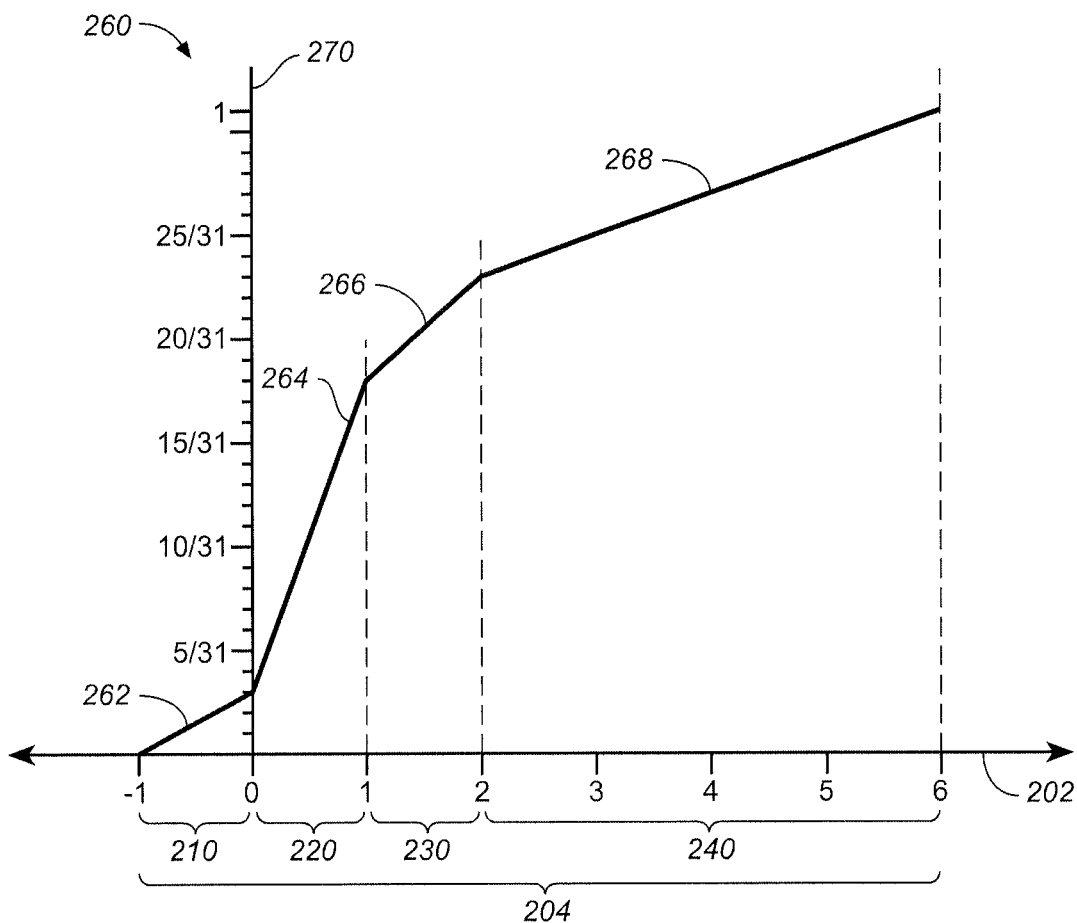
FIG. 2C is a graph illustrating the curve defined by the one dimensional look up table.

FIGS. 2A, 2B, and 2C describe in more detail one example of capturing accuracy for each sub-range in an input range of color component values for a particular color space. Specifically, FIG. 2A is a graph illustrating the possible range of input color component values; FIG. 2B is a depiction of a 1D LUT that captures the level of accuracy for the input color component sub-ranges; and FIG. 2C is a graph illustrating the curve defined by the 1D LUT.

As shown in FIG. 2A, the input color component values 202 may contain several sub-ranges for each component, including in-range values 220, and over-range values (at 242, 210, 230, and 240). A range of interest 204 may also be determined and may include one or more sub-ranges. The range of interest 204 is a range of color component values that may be converted by the color conversion system. In this example, color component values less than −1 and greater than 6 as defined by over-range values 242 are outside of the range of interest. These values (at 242) may be ignored, discarded, clipped, or converted using another process. Depending on the application, the range of interest 204 may be defined differently.

As shown in FIG. 2B, a 1D LUT 250 may be constructed to describe the levels of accuracy for the sub-ranges contained in the range of interest 204. In this example embodiment, the 1D LUT 250 may be used with a 3D LUT to convert color component values in the range of interest 204 from an input color space to an output color space. The 1D LUT 250 in this example performs the function of assigning a number of sample grid points for each component in the 3D LUT based on each sub-range. A sub-range that requires the most accuracy would correspond to more sample grid points having component values in the sub-range. Thus, the 1D LUT 250 may be used to describe the accuracy assigned to each color component sub-range. In this example, it is determined that 32 grid points for each color component are needed in the 3D LUT to accurately convert values in the range of interest 204. The number of grid points may be more or less in other embodiments.

The 1D LUT 250 may include inputs 252 and outputs 254. Each input 252 corresponds to one output 254. Because the number of grid points in the 3D LUT was determined to be 32, the output 254 was constructed to go from 0 to 1 in $\frac{1}{31}$ increments so that the number of grid points for each component dedicated to a particular sub-range may be readily determined from inspection. As a practical matter, any range of values may be used in the output 254.

The data in the 1D LUT 250 is described in such a way that the largest change in output values 254 occurs between the 0 and 1 of input values 252. This large change in output values indicates that a greater number of 3D LUT grid points that will be used to convert in-range values 220. This may be seen more readily in graph 260.

Graph 260 shows the relation of inputs 252 to outputs 254, and connects the points to form a curve that is piece-wise linear. The inputs 252 are shown on the horizontal axis, which is the possible range of input color component values 202, and the outputs 254 are shown on the vertical axis, which is the possible range of outputs 270 corresponding to the possible inputs 202. As can be seen in graph 260, the curve described by the 1D LUT 250 is undefined outside the range of interest 204. As mentioned above, input colors having component values outside the range of interest 204 may be clipped, disregarded, or processed by another mechanism.

The curve described in graph 260 starts with a steady rise (at 262), transitions to a steep rise (at 264), then returns to a steady rise (at 266), and ends with a relatively slow rise (at 268). The slopes of the line segments defined in the range of interest 204 indicate the relative accuracy of the conversion of most colors having component values in each sub-range. Some colors may be converted without interpolation (that is, they correspond to one of the grid points in the 3D LUT), and will have the most accurate conversion regardless of whether they have in-range or over-range component values. The relative accuracy assigned to the various sub-ranges is more important for colors that lie between grid points, the conversion of which may require interpolation.

The highest accuracy is obtained when all input components are within in-range 220 (between 0 and 1). In this case, 16×16×16 grid points from the 3D LUT are used to convert the color. This can be seen from graph 260, where points with values between 0 and 1, inclusive, map to 16 ticks on the vertical axis 270. However, if the first and second components are in-range and the third component is in the range from one to two (at 230), then 16×16×6 grid points from the 3D LUT are used. This results in a less accurate conversion because fewer grid points are used to convert colors having a color component value in the range from one to two (at 230). Roughly half of the 3D LUT, in this example, is used to convert in-range color values 220. If 16 sample grid points are required to accurately convert in-range colors from the input color space to the output color space, then there would be no loss in accuracy for in-range colors. The smallest slope (at 268) indicates that color values in this range correspond to the fewest dedicated points grid points making their conversion the least accurate. The accuracy transform does not have to be piece-wise linear, and the 1D LUT 250 may be constructed to describe any distribution of relative accuracy to any number of sub-ranges.

In operation, once the 1D LUT 250 is constructed, it can be used to create the 3D LUT. The 3D LUT is created by first looking at a regularly-spaced grid having 32 sample points per component or channel. Each point in the regularly-spaced grid is processed through the inverse of the 1D LUT to determine the input color value that corresponds to each point on the grid. By processing the regularly-spaced grid through the inverse of the 1D LUT, the grid points correspond to input color values that are concentrated in the various sub-ranges according to their relative levels of accuracy. Once the corresponding input color value for each sample grid point is determined, each input color value is processed in the most accurate processing steps that convert color values from the input color space to the output color space. This is done to determine the output color value that corresponds to each input color value, which corresponds to a sample grid point. Each output value and its corresponding sample grid point are placed in a 3D LUT. The resulting 3D LUT may then be used along with the 1D LUT to convert input color values to the output color space. For example, an input color value "(0.5, 0.5, 3.75)" may be converted by processing it through the 1D LUT. This may produce a intermediate color value of "(7.5/31, 7.5/31, 26.5/31)," which is then processed through the 3D LUT. The conversion result is not necessarily as accurate as it would be converting input colors having all in-range component values, but it may be sufficiently accurate for the given application.

Figure 3:
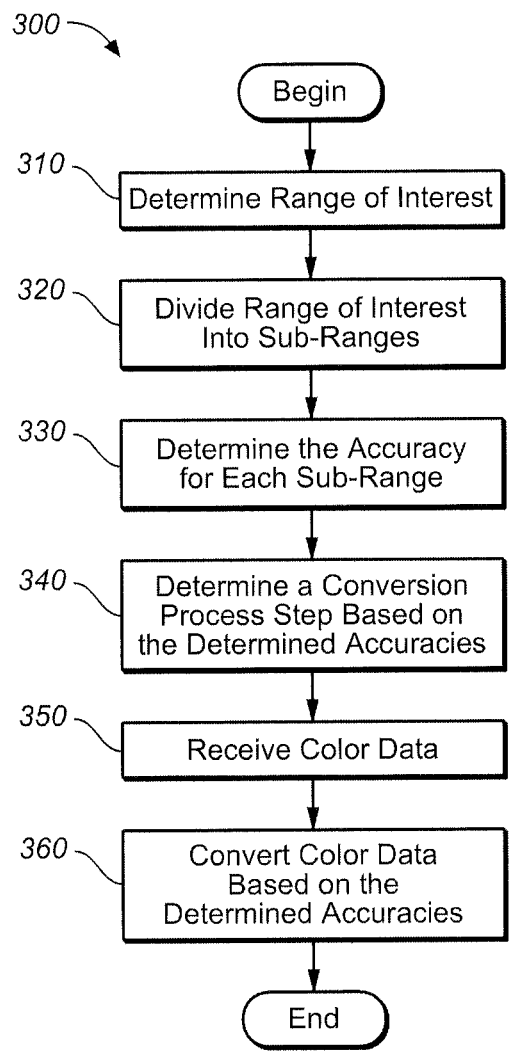
FIG. 3 is a flow chart illustrating a method for converting over-range color values.

FIG. 3 is a flow chart illustrating a process 300 for converting over-range color values. Generally, process 300 involves determining levels of accuracy for sub-ranges of input color values and converting input color values based on those determined levels of accuracy. At step 310, a range of interest of color values in the input color space is determined. The range of interest may vary depending on the application and/or the color spaces involved. Color values that fall outside of the range of interest may be ignored, discarded, clipped, or processed using another mechanism. At step 320, the range of interest is divided into sub-ranges. The sub-ranges may vary in size. A typical sub-range is the 0 to 1 sub-range, which contains in-range values. Sub-ranges containing over-range values may also be defined. For example, one sub-range may include values between 0 and 1.2, while another may include values from 1.2 to 4.0. The number of sub-ranges may be any number.

At step 330, the accuracy level for converting each sub-range is determined. Usually, the higher accuracy levels go to the in-range values and to over-range values relatively proximate to the in-range values. Lower accuracy levels are usually assigned to color values that are far from the in-range sub-range. At this step, a 1D LUT may also be created to capture the accuracy levels. However, any processing logic can be used to make sure the different sub-ranges are processed according to their determined accuracy levels.

At step 340, a conversion processing step is determined for each sub-range based on the accuracy level for each sub-range. Some processing steps are more accurate than others. For example, a 3D LUT having 16 sample grid points is more accurate than a 3D LUT having 8 sample grid points. Other processing steps instead of a 3D LUT may be used, including but not limited to formulas, matrices, and transfer functions.

At step 350, a color value requiring conversion may be received; and at step 360, the color value may be converted. The color value may be converted using the determined accuracy and the conversion processing steps for the determined accuracy.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
    identifying a plurality of sub-ranges of color values of a first color space, wherein the first color space is associated with a first device, the plurality of sub-ranges comprising an in-range sub-range for at least some color values within an intensity range associated with the first device and an over-range sub-range comprising at least some color values outside the intensity range associated with the first device;
    identifying an accuracy level for conversions between the first color space and a second color space of the color values in the over-range sub-range and an additional accuracy level for conversions between the first and second color spaces of the color values in the in-range sub-range, the second color space associated with a second device, the additional accuracy level being greater than the accuracy level for conversions of the color values in the over-range sub-range, wherein identifying the accuracy level and the additional accuracy level comprises:
        accessing a table including input color values and corresponding output color values, wherein a first pair of the input color values defines the over-range sub-range and a second pair of the input color values defines the in-range sub-range;
        determining the accuracy level based on a first difference between a first pair of output color values respectively corresponding to the first pair of input color values; and
        determining the additional accuracy level based on a second difference between a second pair of output color values respectively corresponding to the second pair of input color values, the second difference being greater than the first difference; and
    generating, by a processor, conversion information for converting the color values in the over-range sub-range of the first color space to corresponding color values in the second color space and additional conversion information for converting the color values in the in-range sub-range between the first and second color spaces, wherein the conversion information is generated based on the accuracy level and includes information for converting a color value in the over-range sub-range to a color value in the second color space and the additional conversion information is generated based on the additional accuracy level and includes information for generating a color value in the in-range sub-range to an additional color value in the second color space.

2. The method of claim 1 further comprising:
    receiving an input color value of a color in the first color space; and
    converting the input color value to a corresponding output color value of a color in the second color space by applying one or more processing operations identified for the over-range sub-range in the conversion information.

3. The method of claim 1 further comprising:
    mapping specific color values in the first color space to corresponding color values in the second color space according to determined levels of accuracy for each sub-range; and calculating interpolated color values corresponding to input color values in the first color space that do not match the specific color values.

4. The method of claim 1, wherein the accuracy level corresponds to a number of sample data points in the over-range sub-range and the additional accuracy level corresponds to an additional number of sample data points in the in-range sub-range, wherein the additional number of sample data points in the in-range sub-range is greater than the number of sample data points in the over-range sub-range.

5. The method of claim 1, wherein the plurality of sub-ranges and corresponding accuracy levels for the plurality of sub-ranges vary in size.

6. The method of claim 1 wherein the conversion information is in a multi-dimensional lookup table.

7. The method of claim 1, wherein identifying the accuracy level for the over-range sub-range comprises identifying a relative sub-range rank of the over-range sub-range based on a desired accuracy of conversion of the color values in the over-range sub-range, a higher desired accuracy corresponding to a higher rank and a lower desired accuracy corresponding to a lower rank.

8. A computer program product, encoded on a non-transitory computer-readable storage medium, operable to cause a data processing apparatus to perform operations comprising:
identifying a plurality of sub-ranges of color values of a first color space, wherein the first color space is associated with a first device, the plurality of sub-ranges comprising an in-range sub-range for at least some color values within an intensity range associated with the first device and an over-range sub-range comprising at least some color values outside the intensity range associated with the first device;
identifying an accuracy level for conversions between the first color space and a second color space of the color values in the over-range sub-range and an additional accuracy level for conversions between the first and second color spaces of the color values in the in-range sub-range, the second color space associated with a second device, the additional accuracy level being greater than the accuracy level for conversions of the color values in the over-range sub-range, wherein identifying the accuracy level and the additional accuracy level comprises:
accessing a table including input color values and corresponding output color values, wherein a first pair of the input color values defines the over-range sub-range and a second pair of the input color values defines the in-range sub-range;
determining the accuracy level based on a first difference between a first pair of output color values respectively corresponding to the first pair of input color values; and
determining the additional accuracy level based on a second difference between a second pair of output color values respectively corresponding to the second pair of input color values, the second difference being greater than the first difference; and
generating, by a processor, conversion information for converting the color values in the over-range sub-range of the first color space to corresponding color values in the second color space and additional conversion information for converting the color values in the in-range sub-range between the first and second color spaces, wherein the conversion information is generated based on the accuracy level and includes information for converting a color value in the over-range sub-range to a color value in the second color space and the additional conversion information is generated based on the additional accuracy level and includes information for generating a color value in the in-range sub-range to an additional color value in the second color space.

9. The computer program product of claim 8, wherein the accuracy level for converting each of the plurality of sub-ranges is based on sample data points.

10. The computer program product of claim 8, wherein generating the conversion information comprises:
applying an inverse of the accuracy levels to a multi-dimensional grid of color values in the first color space; and
applying one or more processing operations that convert colors from the first color space to the second color space.

11. The computer program product of claim 8, wherein identifying the accuracy level for each of the plurality of sub-ranges comprises identifying a rank for each sub-range based on a desired accuracy of conversion of the color values in the respective sub-range, a higher desired accuracy corresponding to a higher rank and a lower desired accuracy corresponding to a lower rank.

12. The computer program product of claim 8, further comprising:
receiving a plurality of color values in the first color space; and
converting the received plurality of color values in the first color space to corresponding color values in the second color space based at least in part on the conversion information.

13. The computer program product of claim 8, wherein the plurality of sub-ranges and corresponding accuracy levels for the plurality of sub-ranges vary in size.

14. A system comprising:
a processor,
a memory operable to store instructions that, when executed by the processor, perform operations comprising:
identifying a plurality of sub-ranges of color values of a first color space, wherein the first color space is associated with a first device, the plurality of sub-ranges comprising an in-range sub-range for at least some color values within an intensity range associated with the first device and an over-range sub-range comprising at least some color values outside the intensity range associated with the first device;
identifying an accuracy level for converting between the first color space and a second color space of the color values in the over-range sub-range and an additional accuracy level for conversions between the first and second color spaces of the color values in the in-range sub-range, the second color space associated with a second device, the additional accuracy level being greater than the accuracy level for conversions of the color values in the over-range sub-range, wherein identifying the accuracy level and the additional accuracy level comprises:
accessing a table including input color values and corresponding output color values, wherein a first pair of the input color values defines the over-range sub-range and a second pair of the input color values defines the in-range sub-range,
determining the accuracy level based on a first difference between a first pair of output color values respectively corresponding to the first pair of input color values, and determining the additional accuracy level based on a second difference between a second pair of output color values respectively corresponding to the second pair of input color values, the second difference being greater than the first difference; and generating conversion information for converting the color values in the over-range sub-range of the first color space to corresponding color values in the second color space and additional conversion information for converting the color values in the in-range sub-range between the first and second color spaces, wherein the conversion information is generated based on the accuracy level and includes information for converting a color value in the over-range sub-range to a color value in the second color space and the additional conversion information is generated based on the additional accuracy level and includes information for generating a color value in the in-range sub-range to an additional color value in the second color space.

15. The system of claim 14, wherein the in-range sub-range comprises at least some color values within an intensity range associated with the first device and the over-range sub-range comprises at least some color values outside the intensity range associated with the first device.

16. The system of claim 14, wherein the operations further comprise:
receiving an input color value of a color in the first color space, wherein the input color value is within one of the plurality of sub-ranges; and
converting the received input color value to a corresponding output color value of a color in the second color space.

17. The system of claim 14, wherein each accuracy level for converting each of the plurality of sub-ranges corresponds to a respective number of sample data points in the respective sub-range.

18. The method of claim 1 wherein generating the conversion information and the additional conversion information comprises:
accessing a sample set including sample data points for each component in the second color space;
generating the conversion information by obtaining a number of sample data points from the sample set sufficient to convert the color values in the over-range sub-range at the accuracy level; and
generating the additional conversion information by obtaining an additional number of sample data points from the sample set sufficient to convert the color values in the in-range sub-range at the additional accuracy level, the additional number of sample data points being greater than the number of sample data points.

19. The method of claim 1, wherein generating the conversion information and the additional conversion information comprises:
accessing a sample set including sample data points for each component in the second color space;
generating the conversion information by obtaining a first number of sample data points from the sample set for converting the color values in the over-range sub-range, the first number of sample data points obtained based on the first difference; and
generating the additional conversion information by obtaining a second number of sample data points from the sample set for converting the color values in the over-range sub-range, the second number of sample data points obtained based on the second difference.

* * * * *